United States Patent

Hunter et al.

Patent Number: 6,082,082
Date of Patent: Jul. 4, 2000

[54] DUAL MOTOR DRIVE SYSTEM FOR ELECTRICALLY POWERED MOWER

[75] Inventors: James M. Hunter, Franksville; Dean A. Meyer, Caledonia, both of Wis.

[73] Assignee: Textron Inc., Providence, R.I.

[21] Appl. No.: 08/800,713

[22] Filed: Feb. 14, 1997

[51] Int. Cl.⁷ ................................................ A01D 34/44
[52] U.S. Cl. .................................. 56/7; 56/11.9; 56/249
[58] Field of Search ................................ 56/11.9, 7, 249, 56/249.5, 294, DIG. 20

[56] References Cited

U.S. PATENT DOCUMENTS

| | | |
|---|---|---|
| 2,057,417 | 10/1936 | Clapper . |
| 2,417,613 | 3/1947 | Radabaugh . |
| 3,229,452 | 1/1966 | Hasenbank . |
| 3,410,063 | 11/1968 | Speiser . |
| 3,425,197 | 2/1969 | Kita . |
| 3,429,110 | 2/1969 | Strasel . |
| 3,511,033 | 5/1970 | Strasel . |
| 3,511,034 | 5/1970 | Strasel . |
| 3,581,480 | 6/1971 | O'Connor ................................ 56/249 |
| 3,613,337 | 10/1971 | Akgulian et al. . |
| 3,631,659 | 1/1972 | Horowitz . |
| 3,729,912 | 5/1973 | Weber . |
| 3,732,671 | 5/1973 | Allen et al. . |
| 3,732,673 | 5/1973 | Winn, Jr. . |
| 3,742,685 | 7/1973 | Lian et al. . |
| 3,759,019 | 9/1973 | Wells . |
| 3,841,069 | 10/1974 | Weck . |
| 3,910,016 | 10/1975 | Saiia et al. . |
| 3,924,389 | 12/1975 | Kita . |
| 4,021,996 | 5/1977 | Bartlett et al. . |
| 4,024,448 | 5/1977 | Christianson et al. . |
| 4,145,864 | 3/1979 | Brewster, Jr. . |
| 4,306,402 | 12/1981 | Whimp . |
| 4,680,922 | 7/1987 | Arnold . |
| 4,685,280 | 8/1987 | Lloyd et al. . |
| 4,686,445 | 8/1987 | Phillips . |
| 4,718,286 | 1/1988 | Eller . |
| 4,878,338 | 11/1989 | Aldred et al. . |
| 4,947,630 | 8/1990 | Rich et al. . |
| 4,995,227 | 2/1991 | Foster . |
| 5,007,234 | 4/1991 | Shurman et al. . |
| 5,140,249 | 8/1992 | Linder et al. . |
| 5,204,814 | 4/1993 | Noonan et al. . |
| 5,261,213 | 11/1993 | Humphrey . |
| 5,406,778 | 4/1995 | Lamb et al. . |
| 5,417,193 | 5/1995 | Fillman et al. . |
| 5,502,957 | 4/1996 | Robertson . |
| 5,540,037 | 7/1996 | Lamb et al. . |
| 5,552,240 | 9/1996 | Derstine . |
| 5,553,445 | 9/1996 | Lamb et al. . |

FOREIGN PATENT DOCUMENTS

| | | | |
|---|---|---|---|
| 84961/91 | 10/1994 | Australia . | |
| 536576 | 1/1957 | Canada ................................ | 56/11.9 |
| 2101518 | 7/1972 | Germany ................................ | 56/249 |
| 2101519 | 7/1972 | Germany ................................ | 56/249 |
| 2141706 | 2/1973 | Germany ................................ | 56/249 |
| 1241751 | 8/1971 | United Kingdom ................ | 56/7 |
| WO 93/1264 | 7/1993 | WIPO . | |

OTHER PUBLICATIONS

Owner's Manual and Parts List for Jacobsen 22" Electric Putting Green Mower, Model 110, Ser. No. 1601–Up, pp. 1–15.

Toro Brochure entitled "What mower gives greens the kindest cut of all?" dated Feb. 1994.

Jacobsen Brochure for Tri–King™ Triplex Mowers dated 1992.

Jacobsen Brochure 1671D.

Ransomes Brochure.

*Primary Examiner*—Thomas B. Will
*Assistant Examiner*—Arpad Fabian Kovacs
*Attorney, Agent, or Firm*—Harness, Dickey & Pierce, P.L.C.

[57] ABSTRACT

A unique motor for powering a cutting unit in an electric mower is disclosed. The motor is mounted above the cutting unit. A second motor is provided to drive one or more accessories and is also mounted above the cutting unit. The motors are symmetrically placed toward opposite ends of the cutting unit. The second motor acts as a counterbalance to the first, so the cutting unit has similar weight on both of its ends. This eliminates the need for a torsion spring counterbalance system, allows increased mobility of the cutting unit, and facilitates servicing of the cutting unit.

8 Claims, 7 Drawing Sheets

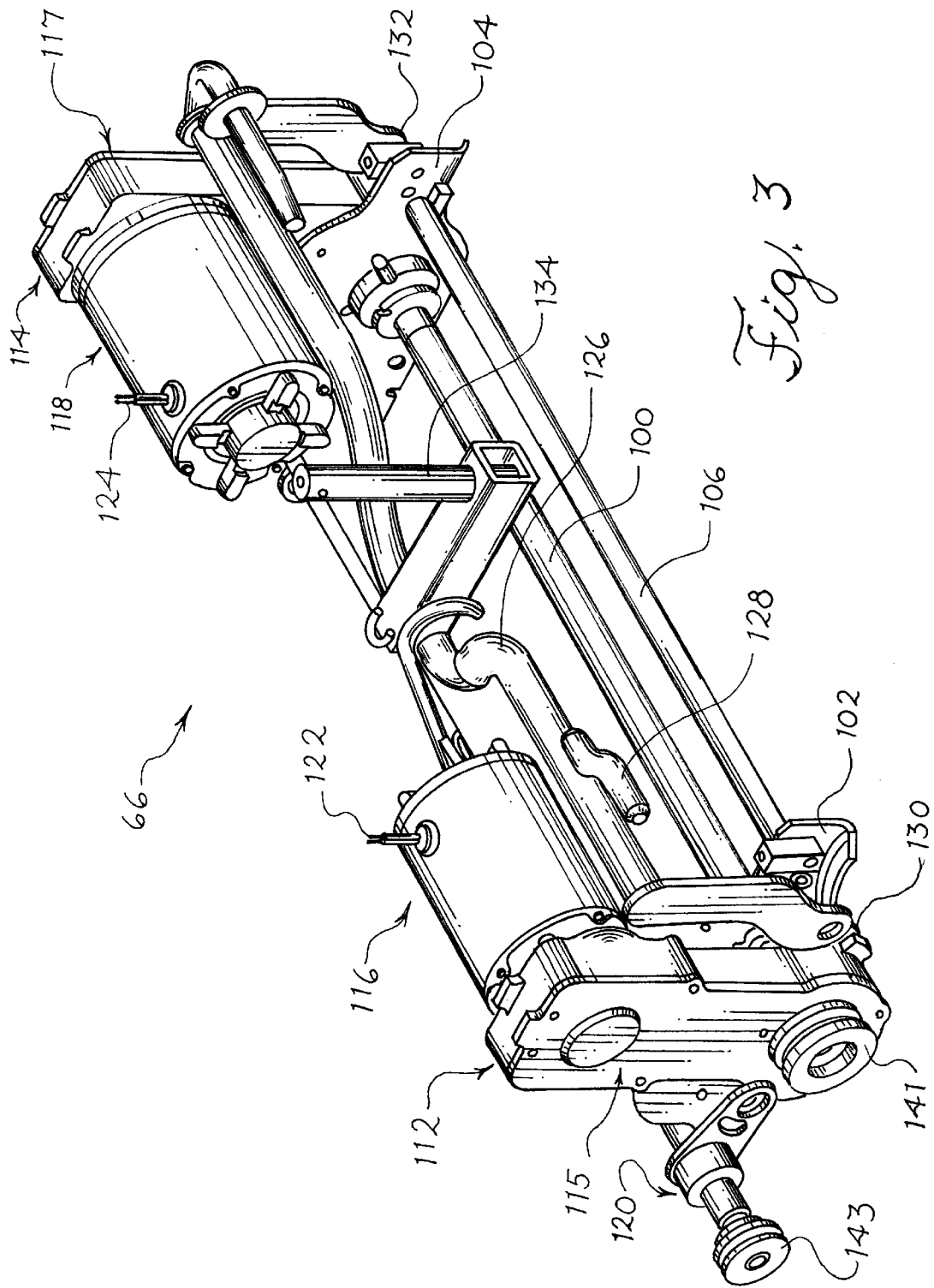

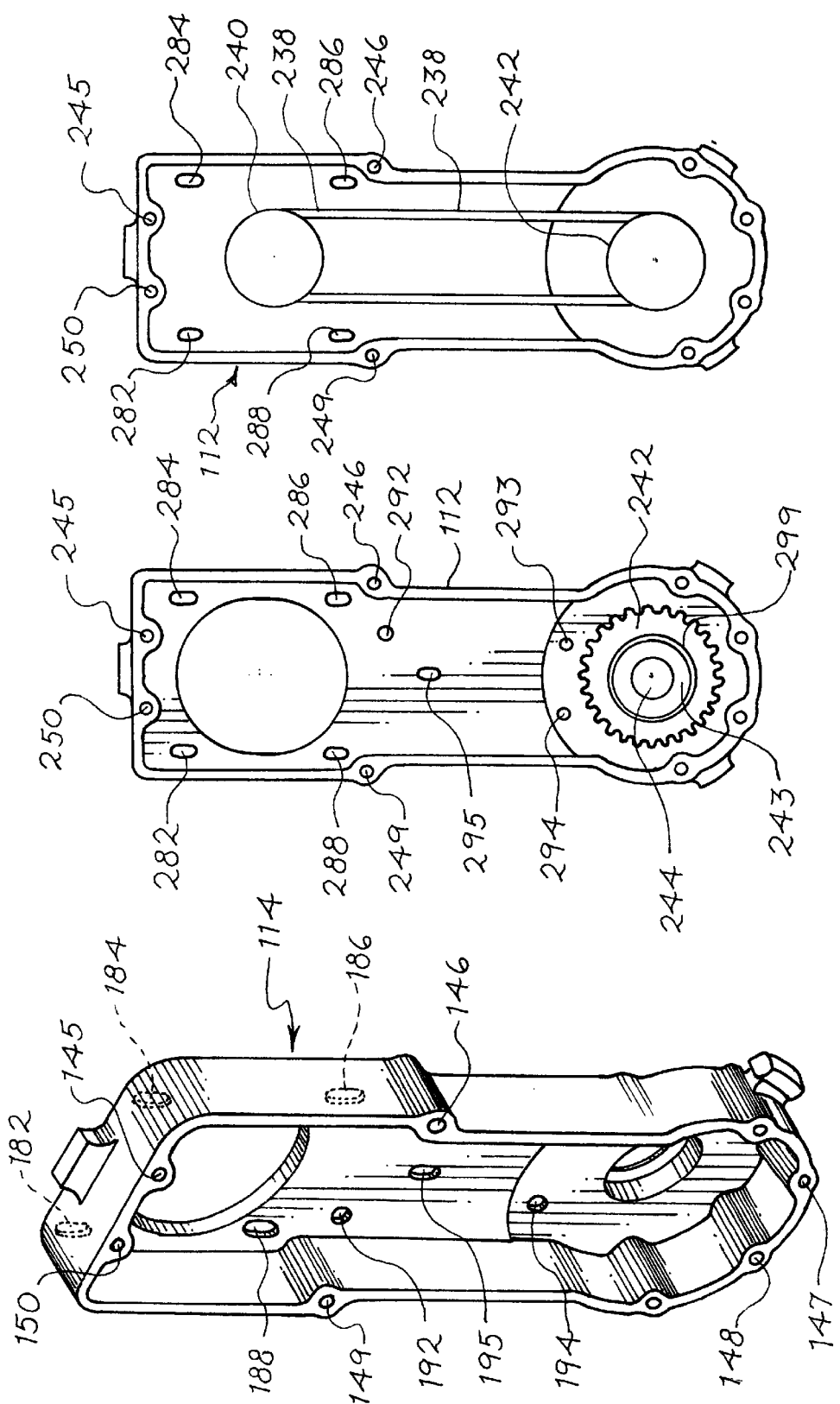

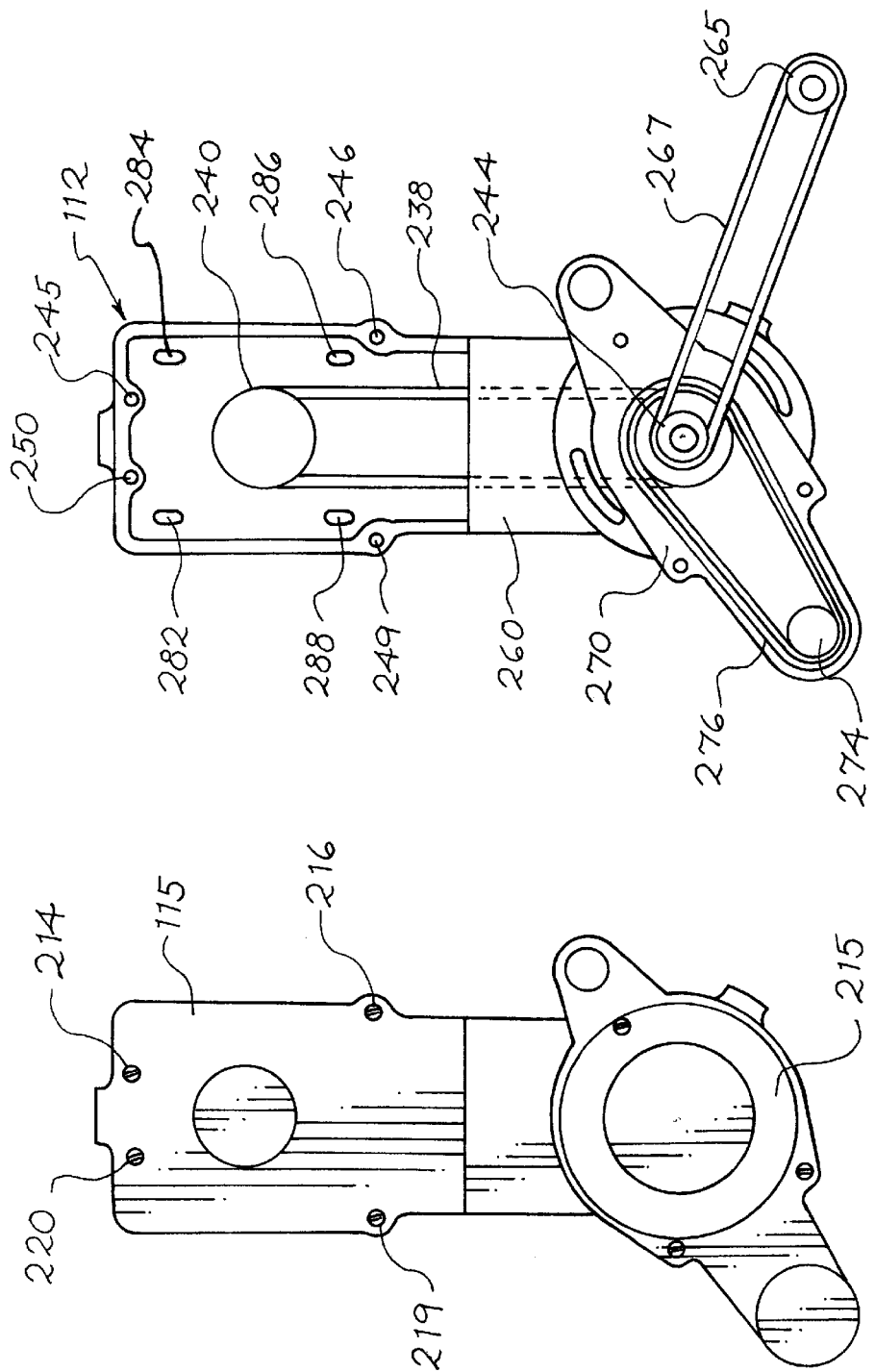

DUAL MOTOR DRIVE SYSTEM FOR ELECTRICALLY POWERED MOWER

BACKGROUND OF THE INVENTION

1. Field of the Invention

This invention relates in general to electrically powered mowers and relates more particularly to such a mower with a dual motor drive system to power the cutting blades and accessories.

2. Prior Art

In the conventional reel mower, each cutting unit is powered by its own reel motor. The reel motor is mounted to one side of the frame of the cutting unit, and drives the reel assembly through a coupling. In an electrically powered mower, the electric motor needed to supply sufficient torque to the reel is quite large, typically 4.0" in diameter and between 6 to 8" long. The large size of this side mounted reel motor may create problems with ground clearance on undulating terrain, clearance between the reels, and clearance between the motor and the fringe cut (the grass bordering the green). For example, since the height of the grass on the green is typically 0.10" to 0.18" and the height of the grass in the area around the green is 0.30" to 0.75", mowing the edge of the green causes the side mounted reel motor to overhang the fringe area adjacent the green. The large reel motor may not clear the taller grass in the fringe area, thus causing undesirable compaction.

A side mounted motor typically also has problems with side clearance. Since the side mounted motor usually extends from the side of the reel by around 6" to 8" inches, if the side mounted motor is mounted on the inside of one of the front reels, the clearance between the two front reels is required to be at least the length of the side mounted motor, thereby limiting closer placement of the reels. Similarly, if the side mounted motor is on the outside of one of the forward reels, it extends an extra 6" to 8" from the side of the reel and thus the entire mower, preventing the mower from making a close cut near bushes, fences, or other obstructions.

Another problem with a side mounted reel motor is that it must be counterbalanced so that the reel will be level and provide an even cut. Prior art greens mowers use a torsion spring counterbalance system, or simply add weight to the other side of the reel to counterbalance the weight of the motor. The total weight of the reel-motor system is increased, causing undesirable compaction of the grass.

Finally, when a reel on a side mounted mower needs service, the side mounted motors must be removed from the reel in order to access and to service the reel.

One prior art mower embodying the above-mentioned drawbacks is described in U.S. Pat. No. 5,406,778 to Lamb.

There is a need, therefore, for a reel mower drive system that does not have the above drawbacks.

SUMMARY OF THE INVENTION

The present invention provides a unique drive system for a mower cutting unit. The motor is mounted above the cutting unit and is belt driven to the cutting unit. A second motor maybe added to drive an optional groomer mechanism or other accessory. The motors are arranged symmetrically above the cutting unit rather than to the side of the cutting unit. The second motor acts as a counterbalance to the first motor, so the cutting unit has similar weight on both sides which eliminates the need for a counterbalance system found in the prior art. Because the motor does not extend from the side of the cutting unit, the cutting unit and the entire mower of the present invention is more mobile.

One object, therefore, of the present invention is to provide a motor for a cutting unit that does not interfere with ground clearance or side clearance of the mower or of the cutting units.

Another object of the present invention is to eliminate the need for an additional, complicated counterbalance system for the motor that powers the cutting unit.

A further object of the present invention is to facilitate the adjustment and sharpening of the cutting unit by simplifying access to the cutting unit for service.

These and other objects, features, and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3 shows a dual motor system in accordance with the present invention with the placement of the motors above the reel;

FIG. 4b shows the dual motor mounting in accordance with the present invention;

FIG. 5a shows the accessory motor mounting in accordance with the present invention;

FIG. 5b shows the accessory motor drive system including the accessory drive pulleys and the accessory drive belt in accordance with the present invention;

FIG. 5e shows the accessory motor mounting cover and the groomer mounting cover; and FIG. 5f shows the accessory motor drive system incorporating a further accessory drive pulley system.

DETAILED DESCRIPTION OF THE PREFERRED EMBODIMENTS

Figure 1:
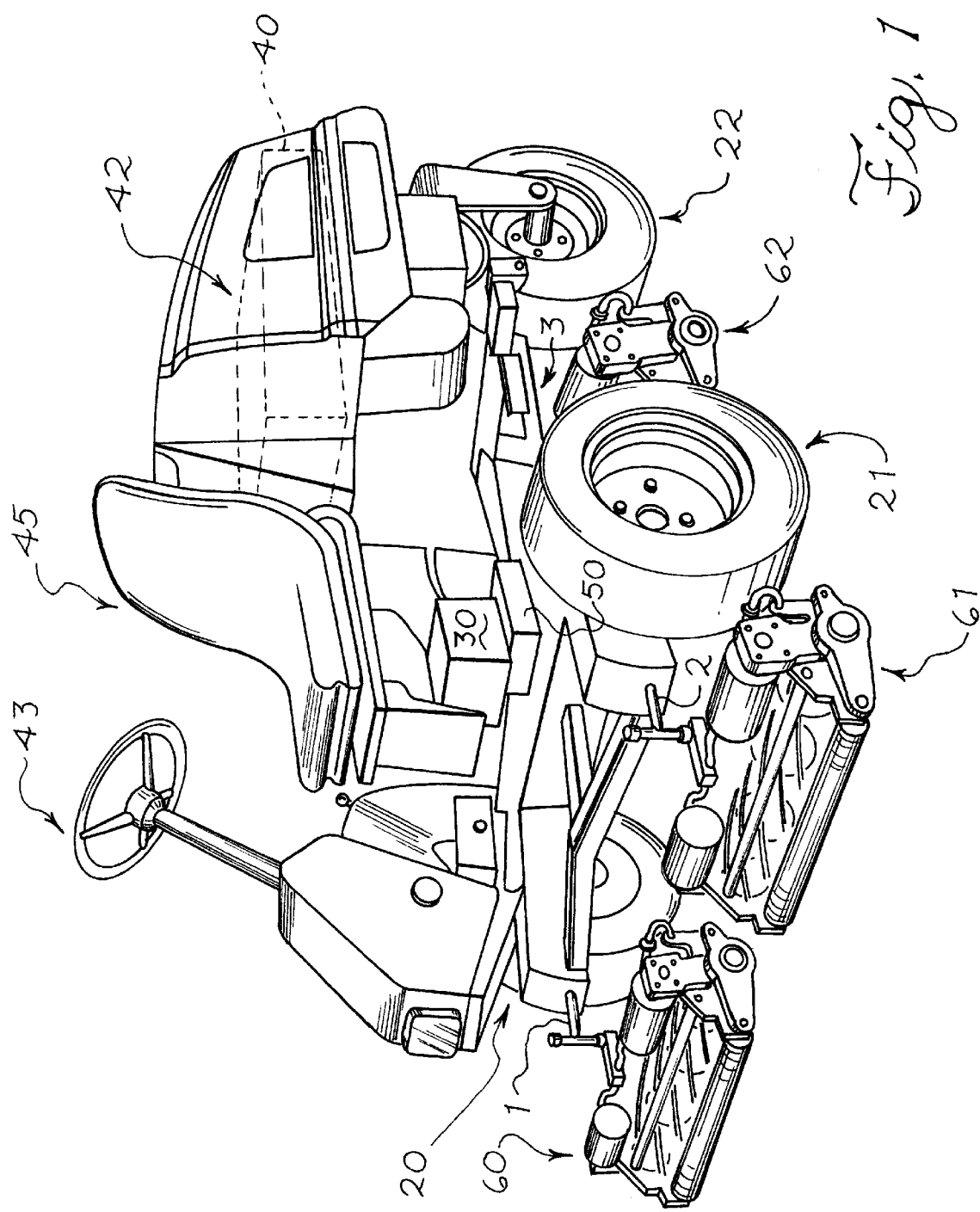
FIG. 1 is general view of an electric greens mower in accordance with the present invention.

In the Figures, a dual motor drive system 66 is provided for an electric mower 10. FIG. 1 is a general illustration of an electric mower 10 in accordance with the present invention. Although the invention is described with respect to the preferred embodiment, those skilled in the art will recognize that other versions of the mower embodying the current invention are possible and that the invention is not limited to one specific embodiment.

In the embodiment shown in FIG. 1, the riding greens mower 10 of the present invention includes three wheels 20, 21 and 22. The two front drive wheels 20 and 21 are powered by electric drive motor 30. The rear wheel 22 is positioned behind and between the two front drive wheels 20 and 21 and is pivotable to steer the mower 10. The cutting units 60, 61, and 62 are positioned ahead of each of the wheels 20, 21, and 22 respectively. The cutting units 60, 61 and 62 are ideally reel cutting units, but can also be rotary cutting units or other types of cutting units. The cutting units 60, 61, and 62 are mounted on lift arms 1, 2 and 3. The operator selectively raises and lowers the lift arms 1, 2 and 3 depending on which cutting units 60, 61, and 63 the operator wishes to use. When in the lowered or operative position, the lifts 1, 2 and 3 allow free vertical motion providing for an even cut over an undulating surface such as a golf course green. The electric drive motor 30 which drives the mower 10, is powered by the battery set 40 (shown in phantom) located underneath a hood 42 and is controlled by the controller 50.

Figure 2:
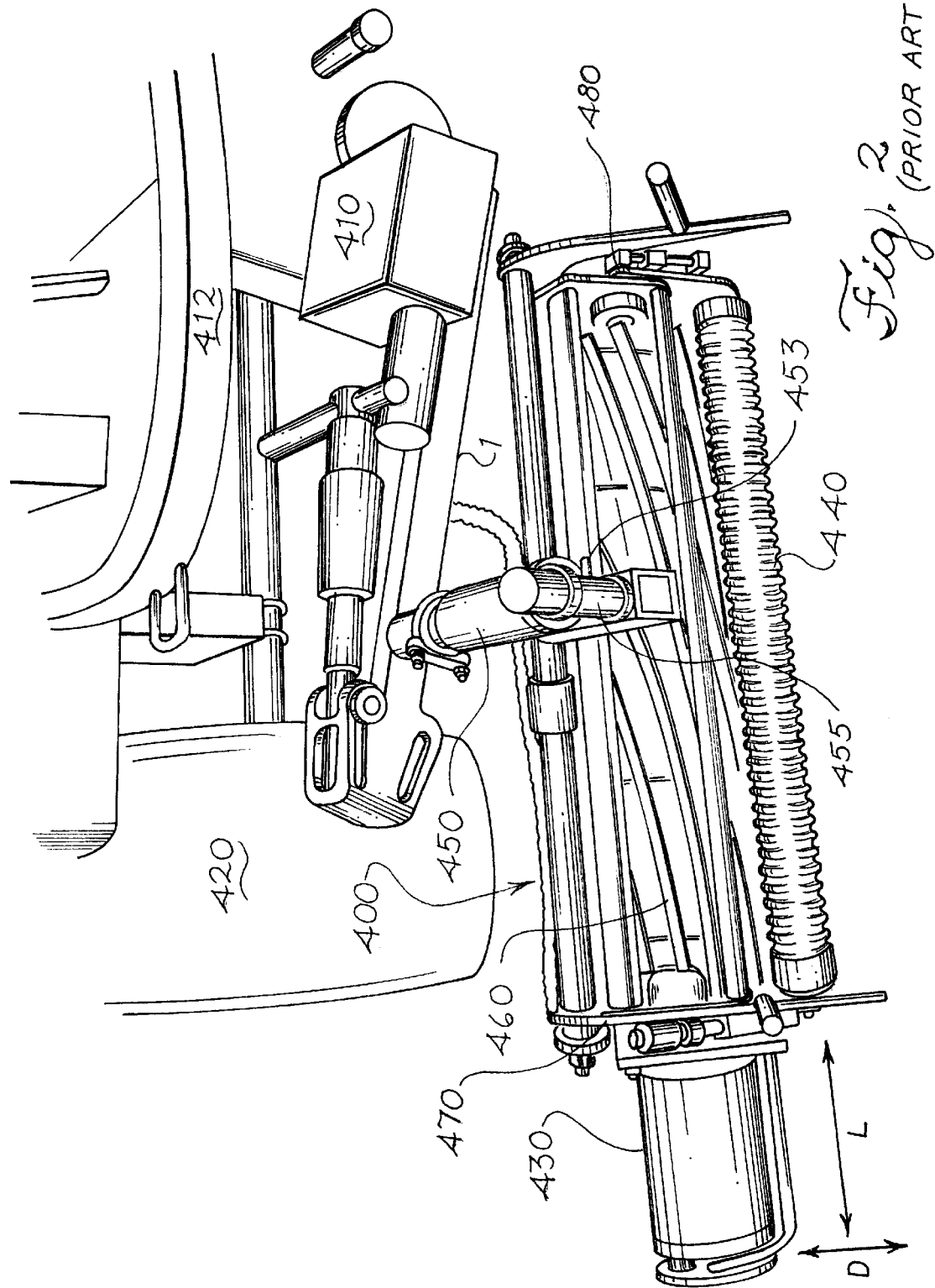
FIG. 2 shows a prior art cutting unit system with the motor mounted to the side of the cutting unit and a groomer attached to the front.

FIG. 2 shows a prior art reel and motor assembly with an optional groomer 440. The side mounted motor 430 is mounted to the reel 400. The reel 400 is connected to the frame 412 of the mower 10 via a lift arm assembly 1. A torsion spring 450 is positioned over the lift arm pivot tube (not shown) and groove pin 453 in swivel housing 455. The torsion spring 450 is tightened to a point that balances the side 470 of the reel 400 having the side mounted motor 430 with the other, lighter side 480 of the reel 400. An electric actuator 410 controllably raises and lowers the reel 400 with respect to the ground at the operator's command. The torsion spring 450 is part of the counterbalance system used in the prior art for the reel 400 to provide an even cut to the grass. Because the side mounted motor 430 makes the side 470 of the reel 400 to which it is attached heavier than the opposing side 480, either a weight equal to that of the side mounted motor 430 is symmetrically applied to the opposing side 480, or the torsion spring 450 described above is used to equate the weight applied to each side 470 and 480 of the reel 400 to achieve an even cut. Adding this extra weight or counterbalance system increases the overall weight applied by the reel 400 thus causing undesirable compaction of the grass and decreasing the active life of the cutting unit.

Another drawback of the reel and motor system of the prior art shown in FIG. 2 is the small ground clearance allowed by the side mounted motor 430. For example, in an electrically powered mower, the size of the side mounted motor 430 to supply sufficient torque to the reel must be quite large and long, typically 4.0" in diameter and between 6–8" long. In FIG. 2, the distance between the bottom of the side mounted motor 430 and the ground is represented by the letter D. Because the height of the grass on the green is typically 0.10" to 0.18" and the height of the grass in the area around the green (called the fringe area) is around 0.30" to 0.75", mowing the edge of the green causes the side mounted motor 430 to extend over the fringe area. The clearance D of the side mounted motor 430 to the ground must be greater than the height of the fringe cut. If the clearance D is less than the height of the fringe cut, the grass in the fringe area will be compacted.

The side mounted motor 430 of the prior art shown in FIG. 2 typically also has problems with side clearance. As mentioned above, the side mounted motor 430 usually extends from the side of the reel 400 by around 6" to 8" inches, represented by length L in FIG. 2. If the side mounted motor 430 is mounted on the inside of one of the front reels, the clearance between the two front reels is required to be at least the length of the side mounted motor 430, thereby limiting closer placement of the reels 400.

Similarly, if the side mounted motor 430 is on the outside of one of the forward reels, it extends an extra length L from the side of the reel 400 and thus, from the entire mower 10, preventing the mower 10 from making a close cut near bushes, fences or other obstructions.

FIG. 3 is a detailed drawing of the dual motor system 66 of the current invention. As an example, cutting unit 60 in FIG. 1 will be explained. Those skilled in the art, however, will recognize that other cutting units on the mower 10 would be constructed in a similar fashion. To aid in describing the construction of the dual motor system 66, the cutting unit blades have been removed from the dual motor system of FIG. 3. Cutting unit shaft 100 extends from one end of the cutting unit 60 to the other. Side plates 102 and 104 hold a rear roller (not shown), a bedknife (not shown) and support the motor mountings 112 and 114. A cross bar 106 is located in front of the cutting unit shaft 100 and is used to support the side plates 102 and 104. Motor mountings 112 and 114 located at either end of the cutting unit shaft 100 support the electric motors 116 and 118 above the cutting unit 60 of the dual motor system 66. Wire groupings 122 and 124 are shown extending from each motor 116 and 118. These wires 122 and 124 connect the motors 116 and 118 to the controller 50 or to the battery 40 (FIG. 1).

A lift yoke 126 operates to raise and lower the cutting unit 60 when necessary. The lift yoke 126 couples the lift 1 to the cutting unit 60. Lifts 1, 2 and 3 are controlled by the operator who selectively chooses which cutting unit 60, 61 and/or 62 he desires to operate. If the operator determines the use of the cutting unit 60, 61 and/or 62 is no longer necessary, because he is transporting the mower 10 to another location or for other reasons, he can direct the respective lift 1, 2 and/or 3 associated with that cutting unit 60, 61 and/or 62 to raise the cutting unit. Similarly, if the desired cutting unit(s) 1, 2, and/or 3 are in the raised position and need to be lowered, the operator directs the respective lift(s) 1, 2, and/or 3 to lower the cutting unit 60, 61, and/or 62. The lift yoke 126 also has a grass catcher hook 128 which when connected to an optional grass catcher (not shown) operates to raise the grass catcher along with the cutting unit 60. Lift yoke 126 is connected to the cutting unit 60 at each end to pivots 130 and 132. Pivot 134 attaches the center of the yoke 126 to the lift 1. The cutting unit 60 is thereby attached to the lift 1 via the lift yoke 126 by pivots 130, 132, and 134. The pivots 130, 132, and 134 work together to allow the cutting unit 60 to travel over bumps and uneven portions of the green while making an even cut.

By using two symmetrically placed motor mountings 112 and 114 to mount the motors 116 and 118 that power the cutting unit 60 and any accessories, the counterbalance system of the prior art mowers is no longer necessary. Similarly, by locating both motors above and substantially inside the envelope of the outside edges of the cutting unit 60, the mower 10 is able to mow tight areas without clearance problems either underneath the cutting units 60, 61, and 62 or to the side of the cutting units 60, 61, and 62 as in the prior art.

The dual motor system 66 described thus far is preferred due to its flexibility. The size of each electric motor 116 and 118 in the dual motor drive system is smaller than the size of a single motor if one motor powered all the functions of the cutting unit 60. Furthermore, as previously described, by placing each motor 116 and 118 substantially within the envelope of the cutting unit 60 and in symmetrical relationship to each other, the counterbalance systems found in the prior art are no longer necessary. Additionally, the dual motor system 66 provides the ability to drive both the cutting unit 60 and any optional accessories such as a groomer or a brush discussed in more detail below.

In some circumstances, however, only one motor per cutting unit may be implemented and still fall within the scope of the present invention. For example, if the operator will not be operating any of the accessory devices available with the dual motor system 66 described above, then one motor located above and substantially within the envelope of the cutting unit 60 still offers many advantages over the prior art side mounted motor 430. Mounting the motor in this manner eliminates both the ground clearance and the side clearance problems inherent in the prior art. Additionally, mounting the motor above the cutting unit instead of to the side decreases the amount of torque necessary to counterbalance the cutting unit.

The closer towards the center of the cutting unit that the motor is mounted, the smaller the counterbalance required. The single motor may also be mounted directly above the center of the cutting unit in one embodiment. In another embodiment for the center mounted motor, power is transferred to the cutting unit at the middle of the cutting unit. In this embodiment, the cutting unit may be divided in the center to receive power from the single motor.

Although the motor in the preferred embodiment is placed horizontally above the cutting unit, a motor may also be mounted vertically with respect to the reel and still obtain many of the advantages described above.

A vertically mounted motor would still fall within the scope of the preferred embodiment since it would eliminate the ground clearance problems and the side clearance problems found in the prior art.

Figure 4A:
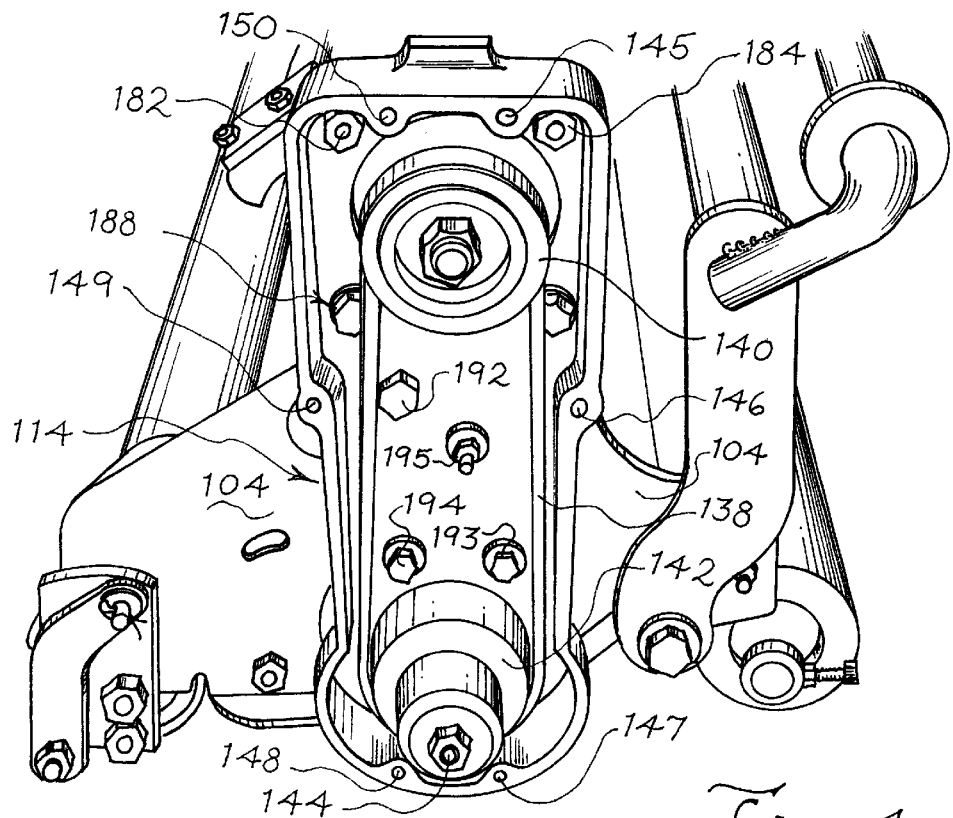
FIG. 4a shows a dual motor system in accordance with the present invention with the reel drive pulleys and the reel drive belt.
Figure 4C:
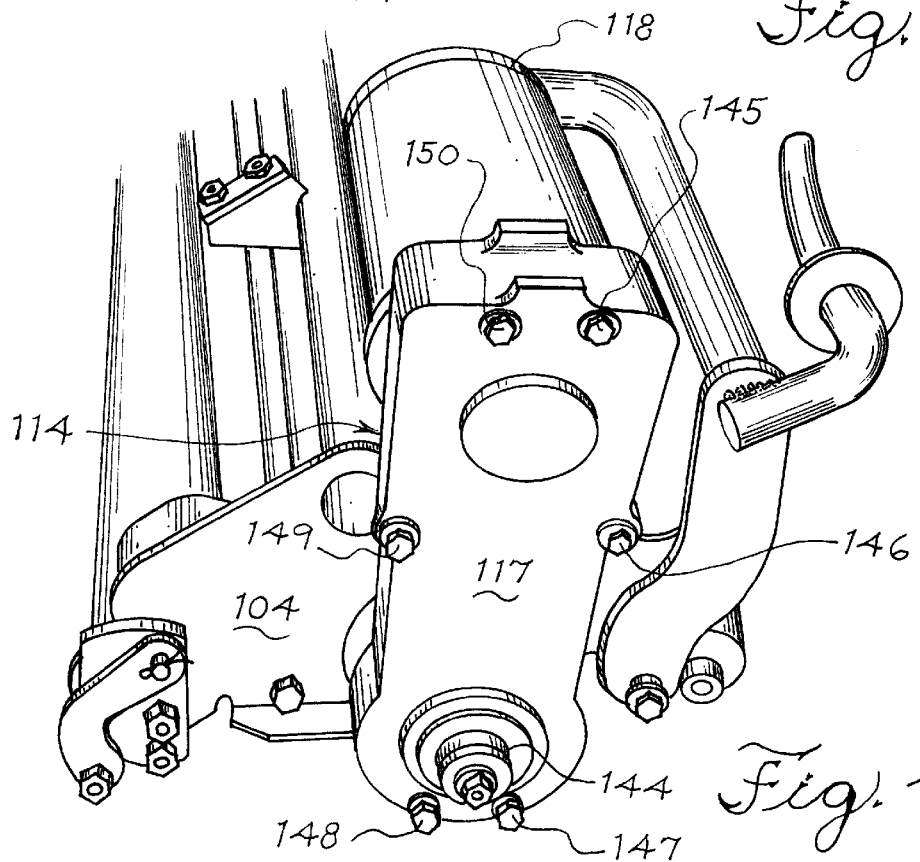
FIG. 4c shows a dual motor system in accordance with the present invention with the drive motor mounting cover in place.

FIGS. 4a, 4b and 4c show the drive motor mounting 114 including the power transfer mechanism and the drive motor mounting cover 117. The power transfer mechanism provides the power connection between the motor 118 and the cutting unit 60. In FIG. 4a, the power transfer mechanism includes the belt 138 that couples an upper pulley 140 to a lower pulley 142. Upper pulley 140 is connected to drive motor 118 and lower pulley 142 is connected to the cutting unit 60. In this manner, the power transfer mechanism operatively connects the primary motor 118 to drive the cutting unit 60. In the preferred embodiment shown in the Figures, the power transfer mechanism includes a dual pulley and belt system. A belt couples the two pulleys thus transmitting power from the drive motor 118 to the cutting unit 60. The coupling of the power transfer mechanism transmits rotary motion from one pulley to another. However, any power transfer system that conveys power from the primary motor 118 to the cutting unit 60 would fall within the scope of the present invention. Although in the embodiment described above the coupling is a belt, the pulleys could also be connected with a chain or other type of power transfer apparatus. The shaft mechanism includes, but is not limited to, any wheel on a shaft having a crowned or cambered rim for carrying a coupling that can be a belt, a rope or a chain. The power transfer system may also include an interactive gear system comprising interlocking gear drivers.

The power transfer mechanism including the belt and pulley structure 138, 140, and 142 is supported by motor mounting 114. Motor mounting 114 is attached to side plate 104 of cutting unit 60 by bolts or screws or other suitable means at locations 192 through 194. Adjustments in the tightness of the belt 138 are made at belt take up location 195. Location 195 is, in one embodiment, a screw that the when turned in one direction stretches the distance between the pulleys 140 and 142 thus tightening the belt 138. Of course, any other type of tensioning device can be used. When turned in another direction, screw 195 decreases the distance between the pulleys 140 and 142 giving the belt 138 more slack. Motor 118 is mounted to the motor mounting 114 by a plurality of screws or bolts or like attachment means placed through holes 182, 184, 186 and 188 in the motor mounting 114 and then affixed to the motor 118. Motor mounting 114 is covered by drive motor mounting cover 117 shown in FIG. 4c. Holes 145 through 150 located in the outer periphery of the motor mounting 114 and in corresponding locations in the drive motor mounting cover 117. The holes 145 through 150 are used to mount the drive motor mounting cover 117 shown in FIG. 4c. Drive motor mounting cover 117, however, should be removably attached so that the pulleys 140 and 142 and the belt 138 can be accessed for cleaning and service. Once again, screws, bolts or other suitable attachment means are used to attach the drive motor mounting cover 117 to the motor mounting 114.

FIG. 4b is a perspective view of the drive motor mounting 114 of the present invention. In FIG. 4b, the pulleys 140 and 142 and the belt 138 are not shown. The drive motor mounting 114 in conjunction with the drive motor mounting cover 117 forms a substantially closed chamber that functions to keep grass cuttings, moisture, and other debris away from the belt 138 and the pulleys 140 and 142. As discussed with respect to FIG. 4a, the drive motor 118 is mounted to the motor mounting 114 by bolts placed through holes 182, 184, 186, and 188 (with 182, 184 and 186 shown in phantom). Holes 145 through 150 are used to affix the drive motor mounting cover 117 shown in FIG. 4c to the motor mounting 114. Holes 192 through 194 mount the motor mounting 114 to the side plate 104 of the cutting unit 60 as shown in FIG. 3.

Returning to FIG. 4c, in place, bolts, screws or other suitable means attach the drive motor mounting cover 117 to the motor mounting 114 through holes 145, 146, 147, 148, 149 and 150. Lower pulley 142, as shown in FIG. 4a, has external portion 144 that extends beyond the drive motor mounting cover 117. This external portion 144 of power transfer mechanism 142 is used to power an optional accessory such as a brush (not shown) from the drive motor 118 by employing a second power transfer mechanism similar to that described above, such as by attaching a second belt to the external portion 144 of pulley 142 and to a further pulley attached to the accessory.

Figure 5D:
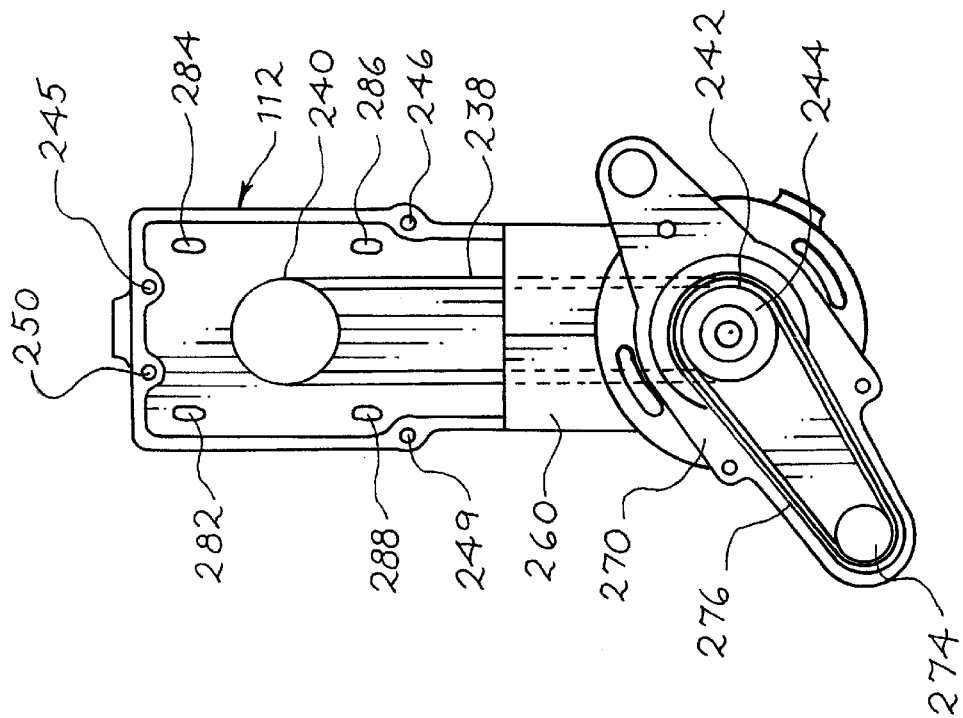
FIG. 5d shows the accessory motor drive system including the groomer pulleys and the groomer belt.

FIGS. 5a through 5e depict the accessory motor mounting 112. FIG. 5a shows the accessory motor mounting 112 with the accessory motor 116 removed. Holes 245, 246, 249, and 250 are used to mount the mounting cover 115 to the accessory motor mounting 112 in the same manner as for the drive motor mounting 114 and drive motor mounting cover 117 described above with respect to FIGS. 4a through 4c. Holes 282, 284, 286, and 288 are used to mount the accessory motor 116 to the accessory motor mounting 112 in the same manner as described above for the drive motor 118 and the drive motor mounting 114. Holes 292 through 294 are used to mount the accessory motor mounting 112 to the side plate 102 of cutting unit 60 in the same manner as described for the drive motor mounting 114 and side plate 104 in FIGS. 4a through 4c. Location 295 is used for belt take up as described with respect to the drive motor mounting 114. The internal portion of the intermediate shaft 243 is used to mount intermediate pulley 242 and the external portion is used to mount groomer accessory drive pulley 244.

The accessory power transfer mechanism is shown in FIG. 5b. The accessory power transfer mechanism provides the power connection between the accessory motor 116 and an optional accessory (not shown). The accessory power transfer mechanism includes both upper pulley 240 and lower pulley 242 having belt 238 operably connecting them. Upper pulley 240 derives power from accessory motor 116 that drives the belt 238 and lower pulley 242 similarly to that disclosed with respect to the drive motor in FIGS. 4a through 4c. Although the power transfer mechanism disclosed in the Figures is a pulley-belt system, those skilled in the art will understand that other power transfer mechanism also can be used such as described with respect to the drive motor 118. Holes 245, 246, 249, and 250 for mounting accessory motor mounting cover 115 and described with respect to FIG. 5a are also shown in FIG. 5b as are holes 282, 284, 286 and 288 for mounting the accessory drive motor 116 and described with respect to FIG. 5a.

Figure 5C:
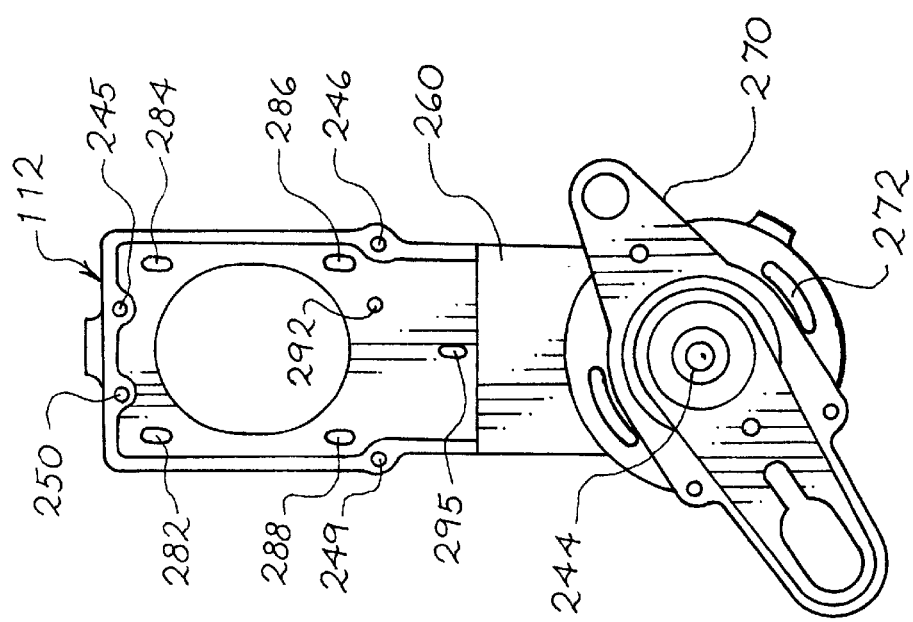
FIG. 5c shows the accessory motor mounting including the groomer drive mounting.

In FIG. 5c adapter plate 260 is used to install the groomer drive mounting 270 to the accessory motor mounting 112. The groomer is an optional accessory for the greens mower 10 in accordance with the present invention. The groomer accessory has a front roller and knives that intersect the roller. The roller lifts horizontally growing grasses, and the knives rotate through the roller slots, cutting blades of grass before they can lie down, so grass stands up for a smoother surface. Regular use of the groomer accessory can increase green speed up to 25 percent, control thatch and eliminate grain. The intersecting action of the groomer§s roller and knives is described in detail in U.S. Pat. Nos. 4,494,365 and 4,685,280 both to Lloyd, and 4,724,662 to Giandenoto and Joray; all three commonly owned by the assignee of this invention.

In FIG. 5c groomer drive mounting 270 pivots on intermediate shaft 243 bearing (FIG. 5a) and is limited in travel by the length of slot 272 in the groomer drive mounting 270. This allows the operator to lock the groomer accessory into a specified position to provide a fixed height with respect to the cutting unit 60. Finally, in FIG. 5c, accessory motor mounting holes 282, 284, 286 and 288 described with respect to FIG. 5a are shown as are side plate 102 mounting hole 292 and belt take up hole 295. Also shown are cover mounting holes 245, 246, 249 and 250.

FIG. 5d shows groomer power transfer mechanism. A groomer pulley 274 and groomer drive belt 276 both are mounted on the inside of groomer drive mounting 270. Groomer drive belt 276 is driven by pulley 244 mounted on the external portion of intermediate shaft 243 attached to lower pulley 242. Accessory motor drive belt 238 is shown coupling pulley 240 and pulley 242 (shown in phantom) under the groomer drive mounting 270 installed on adapter plate 260. Groomer drive belt 276 is driven by pulley 244 mounted on the external intermediate shaft 243 which is located externally to the groomer drive mounting 270. As discussed above with respect to the accessory power transfer mechanism and the drive power transfer mechanism, a belt and pulley system is preferred, but other power transfer mechanism are possible while still remaining within the scope of the present invention. Holes 245, 246, 249, and 250 for mounting accessory motor mounting cover 115 and described with respect to FIG. 5a are also shown in FIG. 5d as are holes 282, 284, 286 and 288 for mounting the accessory drive motor 116.

FIG. 5e shows the accessory motor mounting cover 115 and the groomer drive cover 215. As with the drive motor mounting cover 117 described with respect to FIGS. 4a through 4c, the accessory motor mounting cover 115 is installed with screws or bolts or other suitable means passing through holes 214, 216, 219, and 220 corresponding to holes 245, 246, 249 and 250 in accessory motor mounting cover 115.

Referring to FIG. 5f, another accessory besides the groomer, such as an optional brush, could be added by attaching another belt 267 to external intermediate shaft portion 244 and a pulley 265 on the additional accessory thereby increasing the uses for the accessory motor 116. The brush accessory can be a single push brush that penetrates grass, picks up matted growths and allows sun and moisture to stimulate roots. Or the brush can be a fine bristle brush that lifts runners and controls gaining. Such brushes are known in the prior art and are used on mowers owned by the assignee of the present invention. Or, the accessory could be some other kind of turf maintenance equipment generally known in the art.

In the foregoing specification, the invention has been described with reference to specific embodiments thereof. It will, however, be evident that various modifications and changes may be made thereto without departing from the broader spirit and scope of the invention as set forth in the appended claims.

For example, a riding triplex mower has been disclosed with three wheels and three reels. Mowers could have fewer reels and/or wheels as well as mowers with more reels and/or wheels while still practicing the unique dual motor drive system disclosed above, or the single motor system also disclosed above. A mower having a single cutting unit would also benefit from the above disclosed invention since ground and side clearance would be improved in the same manner as for a three wheeled mower.

Other types of cutting units can be used while still keeping within the scope of the current invention. The invention can be implemented with only one motor to power the cutting unit mounted as described above, or with two motors symmetrically mounted as described above. Such a motor would be mounted as the drive motor in the above specification. Or, if only one motor is used it can be mounted in the center of the cutting unit. The invention can be practiced without using any of the optional accessories, or using any one or all of the optional accessories. Furthermore, the invention can be practiced with other accessories besides those specifically disclosed. The specification and drawings are, accordingly, to be regarded in an illustrative rather than in a restrictive sense.

We claim:

1. A mower comprising:

a frame;

a plurality of wheels supporting the frame;

an electric drive motor disposed on the frame, the electric drive motor powering at least one of the plurality of wheels to drive the frame;

a battery disposed on the frame, the battery providing electric power to the electric drive motor to drive the frame;

At least one elongated cutting unit, having opposing edges, the elongated cutting unit supported by the frame;

a first cutting unit motor distinct from the electric drive motor, the first cutting unit motor mounted substantially within the edges of the elongated cutting unit, the first cutting unit motor operably connected to provide power to the elongated cutting unit; and a second cutting unit motor mounted by a second support member above the elongated cutting unit, wherein the first cutting unit motor and the second cutting unit motor are in symmetrical relationship.

2. The mower of claim 1 wherein the first cutting unit motor is an electric motor and is mounted above the elongated cutting unit by a first support member.

3. The mower of claim 1 further comprising:

an accessory operably connected to the second cutting unit motor.

4. The mower of claim 3 wherein the accessory further comprises a groomer.

5. The mower of claim 3 wherein the accessory further comprises a brush.

6. An electric greens mower comprising:

a frame;

a plurality of wheels supporting the frame;

an electric drive motor disposed on the frame, such that the electric motor provides power to at least one of the plurality of wheels;

a battery disposed on the frame, the battery providing power to the electric motor;

at least one cutting reel supported by the frame; and an electric reel motor mounted above the cutting reel, the electric reel motor to provide power to the cutting reel, the electric reel motor positioned so as not to restrict mobility of the mower; and an electric accessory motor mounted above the cutting reel in symmetrical relationship with the electric reel motor.

7. The mower of claim 6 further comprising an accessory operably connected to the electric accessory motor.

8. The mower of claim 6 further comprising an accessory operably connected to the electric drive motor.

* * * * *